United States Patent [19]
Fernsler

[11] Patent Number: 6,009,006
[45] Date of Patent: *Dec. 28, 1999

[54] SYNCHRONIZED HIGH VOLTAGE GENERATOR

[75] Inventor: Ronald Eugene Fernsler, Indianapolis, Ind.

[73] Assignee: Thomson Consumer Electronics, Inc., Indianapolis, Ind.

[*] Notice: This patent issued on a continued prosecution application filed under 37 CFR 1.53(d), and is subject to the twenty year patent term provisions of 35 U.S.C. 154(a)(2).

[21] Appl. No.: 09/130,961

[22] Filed: Aug. 7, 1998

[51] Int. Cl.$^6$ .............................. H02M 7/515; H04N 5/04
[52] U.S. Cl. ............................... 363/97; 348/542
[58] Field of Search .................. 363/34, 40, 41, 363/95, 97; 315/371, 387, 403, 411; 348/542, 541, 730, 524

[56] References Cited

U.S. PATENT DOCUMENTS

| | | | |
|---|---|---|---|
| 3,897,150 | 7/1975 | Bridges et al. | 356/5.04 |
| 3,917,902 | 11/1975 | Olson | 348/181 |
| 4,171,504 | 10/1979 | Strathman | 315/378 |
| 4,317,133 | 2/1982 | Fernsler et al. | 348/541 |
| 4,394,722 | 7/1993 | Nero | 363/68 |
| 4,430,649 | 2/1984 | Leininger | 345/128 |
| 4,516,169 | 5/1985 | Truskalo | 348/730 |
| 4,525,739 | 6/1985 | Fitzgerald | 358/190 |
| 4,531,181 | 7/1985 | Herz et al. | 363/21 |
| 4,559,481 | 12/1985 | Dietz | 315/411 |
| 4,644,230 | 2/1987 | Federle | 3158/382 |
| 4,645,985 | 2/1987 | Dietz | 315/371 |
| 4,654,989 | 2/1987 | Barnes | 315/411 |

(List continued on next page.)

FOREIGN PATENT DOCUMENTS 483 432  5/1992  European Pat. Off. ....... H02M 3/335

OTHER PUBLICATIONS

Motorola, Inc. *Hogh Performance Current Mode Controllers,*Motorola Analog IC Device Data for type UC3842, pp. 1–15 1996. No Month.

Motorola Inc. *TV Horizontal Processor*MC1391 pp. 1–6 MC1391/D 1996. No Month.

Mitsubishi *Synchronization Deflection System Control PWM IC*data sheet for M62500P pp.1–77 undated.

Mitsubishi *Sync Signal Processor*IC data sheet for M52347SP pp. 1–16 updated.

NEC Bipolar Analog Integrated Circuit μPC1883 pp. 1–32 1995, with English translation pp. 1–23. No Month.

Goldstar, *Goldstar Color Monitor Service Manual,*Jun. 1994, cover sheet, pp. 34–37.

Panasonic *Multi–Scan Color CRT Display*model TX–D2162 Service Manual pp. 1–81 dated 1996. No Month.

U.S. Patent Application No. 09/130,953, D.R. jackson, *High–Voltage Power Supply For Video Display Apparatus,* Filed Aug. 7, 1998.

*Primary Examiner*—Adolf Deneke Berhane
*Attorney, Agent, or Firm*—Joseph S. Tripoli; Joseph J. Laks; Francis A. Davenport

[57] ABSTRACT

In a video display operable at multiple horizontal scanning frequencies, a synchronized high voltage generator is substantially undisturbed during synchronizing source selection or interruption. The generator comprises a controlled oscillator generating a drive signal. A source of pulses synchronizes the controlled oscillator and has a plurality of scanning frequencies. A high voltage generator is coupled to the drive signal and generates a display energizing supply. The scanning frequencies occur in two frequency bands, and when synchronized the oscillator generates the drive signal having a frequency only in a higher frequency band of the two frequency bands. In a further inventive arrangement a high voltage generator for a video display is operable at a plurality of horizontal scanning frequencies and is controlled such that the high voltage supply remains substantially constant during an interruption of horizontal scanning pulses from the source.

16 Claims, 1 Drawing Sheet

U.S. PATENT DOCUMENTS

| | | | |
|---|---|---|---|
| 4,654,990 | 2/1987 | Willis | 315/411 |
| 4,939,429 | 7/1990 | Rodriquez-Cavazos et al. | 315/411 |
| 4,658,342 | 4/1987 | Wharton | 363/21 |
| 4,825,129 | 4/1989 | Nero | 315/278 |
| 4,996,596 | 2/1991 | Hirao et al. | 348/542 |
| 5,010,281 | 4/1991 | Rodriquez-Cavazos. | 315/411 |
| 5,034,667 | 7/1991 | Lendaro | 315/411 |
| 5,179,331 | 1/1993 | Sloot | 315/411 |
| 5,270,823 | 12/1993 | Beidebroek et al. | 358/190 |
| 5,412,290 | 5/1995 | Helfrich | 315/371 |
| 5,418,705 | 5/1995 | Smith et al. | 363/56 |
| 5,428,272 | 6/1995 | George et al. | 315/411 |
| 5,463,290 | 10/1995 | Fitzgerald | 315/411 |
| 5,602,447 | 2/1997 | Smith | 315/411 |

SYNCHRONIZED HIGH VOLTAGE GENERATOR

This invention relates generally to the field of video displays operable at multiple horizontal scanning frequencies and in particular to the generation and synchronization of high voltage power supplies.

BACKGROUND

In a video display apparatus, scanning circuits are synchronized to a synchronizing component derived from the input video signal. Similarly the display device, for example a cathode ray tube has high voltage and heater supplies generated by the scanning circuitry. A video display which is capable of displaying, for example a standard definition, NTSC signal, a high definition, Advanced Television Standards Committee signal, or a computer generated SVGA signal, is capable of synchronizing to these signals which represent a range of horizontal frequencies in excess of 2:1. Although synchronized operation of deflection generated high voltage supplies is possible with the range of horizontal frequencies presented by the input selections, the complexity of design and material cost suggest that high voltage generation may be facilitated more efficiently by a high voltage generator which is separate from the deflection generation requirements of operability over the complete range of horizontal frequencies.

A high voltage power supply which is not part of a deflection generator may be synchronized with the input horizontal sync signal to reduce the visibility of power supply switching interference. However, since the input horizontal frequencies occupy nominally two frequency bands, with the higher frequency band more than double the frequency of NTSC, it is a requirement that a high voltage generator is not disturbed significantly when switching between such sync sources. Furthermore, when sync switching occurs, for example as a consequence of broadcast TV channel change or computer display resolution selection, the high voltage supply is required to remain substantially constant to avoid additional delay in the presentation of the newly selected picture source.

SUMMARY OF THE INVENTION

The requirements for a synchronized high voltage power supply which is substantially undisturbed during synchronizing source interruption is advantageously provided by an inventive arrangement. A high voltage supply for a video display is operable at a plurality of horizontal scanning frequencies. The generator comprises a controlled oscillator generating a drive signal. A source of pulses having a plurality of scanning frequencies is coupled to synchronize the controlled oscillator. A high voltage generator is coupled to the drive signal and generates a display energizing supply. The plurality of scanning frequencies occur in two frequency bands, and when synchronized the oscillator generates the drive signal having a frequency only in a higher frequency band of the two bands of frequencies. In a further inventive arrangement a high voltage supply for a video display is operable at a plurality of horizontal scanning frequencies. The generator comprises a controlled oscillator generating a drive signal. A source of pulses for synchronizing the controlled oscillator has a plurality of scanning frequencies. A high voltage generator is coupled to the drive signal and generates a display energizing supply. A switching power supply is coupled to power the high voltage generator. A width modulated pulse generator is coupled to drive the switching power supply. The width modulated pulse generator is controlled responsive to a value of the energizing supply such that the energizing supply remains substantially constant during an interruption of the pulses from the source.

DETAILED DESCRIPTION

Figure 1:
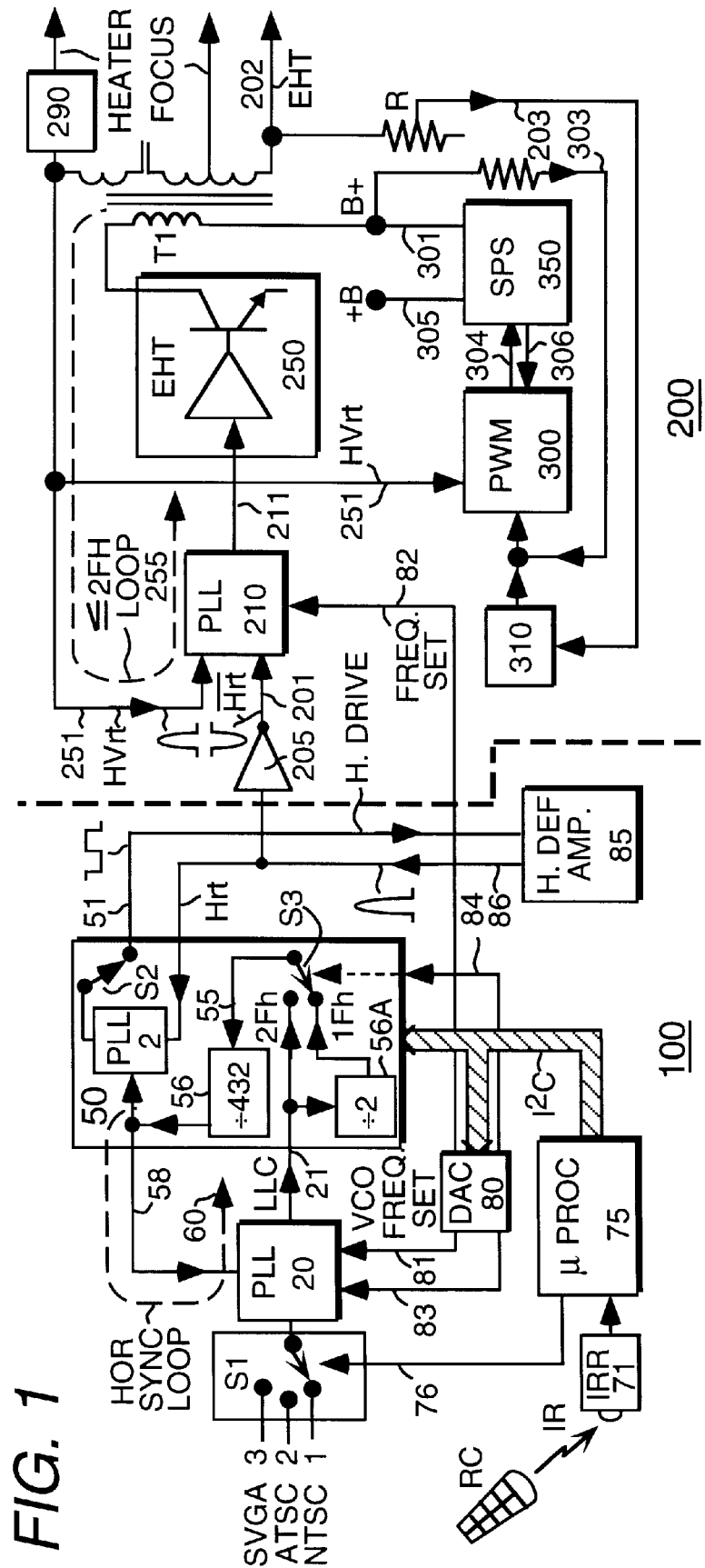
FIG. 1 is a block diagram of an exemplary high voltage generator which includes various inventive arrangements.

The block diagram of FIG. 1 shows an inventive high voltage generator which is regulated and synchronized to a plurality of horizontal rates to provide display energizing supplies that are substantially uneffected by synchronizing source frequency or interruption. In FIG. 1, sync source section, synchronization and control is shown in area 100. An exemplary switch S1 provides selection between three sync signals, derived from input display signals having differing horizontal rates. Selector switch S1 is controlled by microcontroller 75. The exemplary sync signals are depicted as a standard definition NTSC signal, a high definition ATSC signal and computer generated SVGA signal, and these have the following respective horizontal frequencies, 15.734 kHz or 1 Fh, 33.670 kHz or 2.14 Fh, and 37.880 kHz or 2.4 Fh. Selection between these sync sources is by means of control signal 76 generated by microcontroller 75 in response to a user control command, for example, as generated by a remote control transmitter RC, which communicates by wireless means IR to receiver IRR, 71 which inputs remote control data to microcontroller 75. Remote control RC allows display signal source selection, for example, changing broadcast TV channels between HD and SD broadcasts or viewing a computer program with selectable display resolution. The selected sync source is output from switch S1 as sync signal 21 and is coupled to a phase detector, for example IC type 74HC4046, which forms part of controlled oscillator, PLL 20. The second input to the phase detector is a horizontal rate pulse 58 output from sync processor 50. The phase detector output synchronizes the controllable oscillator of PLL 20 and generates an output line locked clock, LLC, 21. Sync processor 50 is an I$^2$C bus controlled multifunction pulse and deflection waveform generator, for example, integrated circuit type TDA9151. In addition, sync processor 50 includes a further PLL controlled oscillator and a selectable count down divider. Line locked clock signal, LLC, 21 is coupled to sync processor 50 and is input to dividers 56 and 56A. Switch signal 84 from DAC 80, controls switch S3 to insert a divide by two divider 56A, in series with divider 56 to produce division by 864. When switch S3 bypasses divider 56A signal LLC, 21 is coupled directly to divider 56 and is divided by 432. Hence to derive horizontal rate signal 58 for comparison in PLL 20, the controlled oscillator PLL20 generating line locked clock, 21, is required to have a frequency of either 432 or 864 times that of the input horizontal frequency, for example approximately 13.6 MHz. In simple terms by switching divider 56A, horizontal signal 58 may be generated with a frequency of 15.734 kHz or 31.468 kHz. However, as has been described, neither exemplary ATSC or SVGA signals have horizontal frequencies that are double or even an integer multiple of the NTSC 1 Fh horizontal frequency. Thus to enable PLL 20 and sync processor 50 to be synchronized by non-integer multiples of NTSC sync signals, PLL 20 is advantageously controlled. Signals 81 and 83 are originated by microcontroller 75 in response to signal source selection and output via I²C bus for processing by DAC 80. Digital to analog converter 80 generates control voltages specific to each horizontal frequency to provide control of oscillator 20 frequency such that when divided by 432 or 864, signal 58 has the frequency required by the selected sync source. Thus horizontal sync loop 60, formed by the combination of PLL20 and sync processor 50 generate a synchronized horizontal rate signal 58 which has a frequency within one of two frequency bands, namely 1 Fh, or 2 Fh or greater.

Divided signal 58 is also coupled within processor 50 to second phase locked loop PLL2 which synchronizes the horizontal scanning frequency by means of retrace pulse Hrt 86 coupled from horizontal scanning amplifier 85. A horizontal rate drive pulse 51 is output from PLL2 and coupled to horizontal scanning amplifier, H. DEF. AMP. 85.

To prevent the possibility of circuitry damage resulting when division ratios are switched within processor 50, an I²C bus command, LFSS, (line frame start stop) is output from microcontroller 75. This instruction is arranged to precede bus outputting and DAC generation of divider switch control signal 84. Thus bus command, LFSS, turns off both horizontal drive, H. Drive, 51, and frame pulse generation. The functional result of command LFSS is depicted by switch S2 which inhibits drive pulse 51 output until the command LFSS is rescinded, for example, after a timed period or following stabilization of the newly selected sync source. Inhibition or interruption of pulse signal 51 may have a duration of at least 50 milliseconds.

Generation of cathode ray tube energizing supplies takes place in block 200 which comprises a high voltage generator, EHT 250 driven by pulses 211 from phase locked oscillator PLL 210 which is synchronized by an inverted retrace pulse $\overline{Hrt}$ 201. The high voltage supply, EHT, 202 is regulated by a switching power supply 350 which controls power source B+ supplied to generator EHT 250. The high voltage supply EHT, 202 is voltage divided by element R to form signal 203 which is coupled to a buffer amplifier 310, for example a voltage follower. The buffered form of voltage 203 is summed with a control voltage 303, derived from high voltage power source B+, and applied to control the pulse width of a output switching signal 304 which drives switching power supply 350.

As has been described horizontal drive, 51 is routed through exemplary inhibit switch S2 to drive horizontal amplifier 85. Retrace pulse 86, generated by amplifier 85 is inverted by invertor 205 forming pulse $\overline{Hrt}$, 201 which is coupled to synchronize a phase locked oscillator PLL210 which forms part of high voltage generator 200. Phase locked oscillator PLL210, for example I.C. type CA1391, forms part of a synchronizing loop, ≦2 Fh LOOP, 255. The oscillator within PLL210 is synchronized by comparison between a retrace pulse HVrt, 251, generated by high voltage switching supply EHT 250 and inverted retrace pulse $\overline{Hrt}$, 201. As discussed previously, input signal scanning rates occupy two frequency bands with the higher band having frequencies more than double that of a standard definition signal. However, although phase locked oscillator 210 is synchronized by inverted retrace pulse $\overline{Hrt}$, 201, oscillator 210 advantageously maintains a synchronized frequency within the higher band of scanning frequencies. Thus when a standard definition source is selected for display, oscillator 210 is synchronized by comparison between NTSC related pulses $\overline{Hrt}$, having a rate represented by 1 Fh, and alternate high voltage retrace pulses HVrt, 251 having a rate represented by 2 Fh. Thus during NTSC operation, oscillator 210 and high voltage switching supply EHT 250 are synchronized to the second harmonic of the NTSC horizontal sync frequency.

When an ATSC or SVGA signal is selected for viewing their respective scanning rates of 2.14 Fh or 2.4 Fh occur in the higher band of sync frequencies. Thus high voltage retrace pulse HVrt and inverted retrace pulse 201 both have rates of 2.14 Fh or 2.4 Fh respectively, hence oscillator 210 is synchronized cycle by cycle. To facilitate synchronization at the various scanning rates in the higher frequency band, a frequency offsetting analog voltage 82, is coupled to shift the free running frequency of oscillator 210. Offset voltage 82, is read from a memory (not shown) by microcontroller 75 in response to each input signal selection. The stored centering data value is coupled to exemplary I²C bus for conversion to Freq. Set voltage, 82, by digital to analog converter 80. Thus the advantageous synchronization of PLL 210 allows high voltage switching supply 250 to be operated in synchronism with any selected input scanning rate but with a synchronized frequency within a limited high frequency range, for example, between 2 Fh and 2.4 Fh. Thus any power supply switching transients are stationary relative to the displayed image and occur substantially within the horizontal banking and overscan regions of the displayed image. In addition, by advantageously controlling switching to the higher range of sync frequencies both power supplies, 250 and 350 benefit from improved power conversion efficiency and reduced component size.

As has been described, synchronizing pulses 51 are controllably interrupted or inhibited by bus command LFSS during selection between horizontal scanning frequencies. Such sync pulse interruption or perturbations may result from broadcast channel switching, for example selection between NTSC and ATSC transmissions or when selecting a base band signal, for example a computer generated SVGA signal. However, during the suspension of pulse 51 and the consequential termination of retrace pulses 86 and 201, it is essential that the display device, for example a CRT, continues to receive energizing power, for example high voltage and or heater supplies. Thus, during such synchronizing pulse interruptions PLL 210 continues to generate drive pulses for generator EHT 250, at a free running frequency offset by control voltage 82. Thus ultor voltage EHT, and tube heater supplies are sustained and are substantially uneffected by interruption of retrace pulses 86 and 201.

The advantageous synchronized operation of high voltage generator 250 within the higher band of sync frequencies results in a frequency range or change of approximately 6 kHz. This change in power supply switching frequency produces a corresponding change in retrace pulse amplitude and in the voltage generated therefrom. Thus, high voltage variation resulting from changes in switching frequency are substantially reduced, or eliminated by feedback voltage 203 developed by potentiometer R and coupled to pulse width modulator PWM 300.

High voltage supply 202 is generated by switching power supply 250, the operation of which is well known. High voltage 202 is regulated or controlled in amplitude by means of a controlled power source B+ which energizes high voltage supply 250. Controlled power source B+ is generated by a switching power supply SPS 350, which operates in a known manner, and is driven with width modulated pulse 304 generated by pulse width modulator PWM 300. Pulse width modulator 300 is a current mode controller, for example integrated circuit type UC3842. The pulse frequency of PWM 300 is synchronized to the switching frequency of the high voltage supply by means of retrace pulse HVrt, 251 generated by switching action of generator 250 and transformer T1. Thus both high voltage supply 250 and its regulating power supply SPS 350, are synchronous and initiate switching within the width of retrace pulse HVrt. Furthermore, since PLL 210 is synchronized by means of inverted retrace pulse 201, any unwanted switching transients resulting from either switching supply are stationary relative to the display scanning frequency and are substantially confined within the horizontal blanking and overscan regions of the display.

The operation of switching power supply SPS 350 is well known. Switching power supply SPS 350 is driven by width modulated pulse 304 generated by pulse width modulator PWM 300. The internal oscillator is driven by pulse HVrt, as described, and the output pulse width is varied in response to a comparison between an internal 2.5 volt reference and a derived voltage of nominally 2.5 volts buffered by voltage follower 310 and formed by potentiometric division, depicted by resistor R, of ultor voltage EHT 202. The output supply voltage B+ from power supply SPS 300 is also fed back to the voltage reference input of PWM 300 to prevent scanning frequency dependent variation of power source +B, 305 from causing variation of the high voltage supply.

The advantageous synchronization of high voltage supply 250 facilitates selection between display sources with differing scanning frequencies without significant additional delay in picture presentation.

What is claimed is:

1. A high voltage supply for a video display operable with video signals having horizontal scanning frequencies occurring in two frequency bands, said high voltage supply comprising:

a phase locked oscillator generating a drive signal;

a source of deflection rate pulses coupled to synchronize said drive signal; and, a high voltage generator coupled to said drive signal and generating a display energizing supply, wherein said deflection rate pulses, when representative of video signal having a horizontal scanning frequency occurring in the lower of the two frequency bands, synchronize said oscillator to operate at a frequency occurring in the higher of said two frequency bands.

2. The high voltage supply of claim 1, wherein said phase locked oscillator is controlled in frequency responsive to a micro processor output signal.

3. The high voltage supply of claim 1, wherein said phase locked oscillator is controlled in frequency responsive to a signal indicative of one of said plurality of scanning frequencies.

4. The high voltage supply of claim 1, wherein said drive signal is an integer harmonic of one of said plurality of scanning frequencies.

5. The high voltage supply of claim 1, wherein said drive signal is coupled exclusively to said high voltage generator.

6. A high voltage supply for a video display operable with video signals having horizontal scanning frequencies occuring in a plurality of frequencies, said high voltage supply comprising:

a controlled oscillator generating a power supply drive signal;

a source of sync pulses representative of the horizontal scanning frequency of said video signals coupled for synchronizing said drive signal; and, a switch power supply coupled to said drive signal and generating a high voltage supply for said display, wherein during a transition between a first video signal having a first horizontal scanning frequency, and a second video signal having a second horizontal scanning frequency, high voltage supply operation is maintained without significant disturbance of said high voltage supply generated by said switching power supply.

7. The high voltage supply of claim 6, wherein said transition interrupts said sync pulses without interruption of said high voltage supply.

8. The high voltage supply of claim 6, wherein said drive signal is coupled exclusively to said switching power supply.

9. The high voltage supply of claim 6, wherein said switching power supply includes a width modulated pulse generator generating a power supply for said high voltage generator.

10. The high voltage supply of claim 9, wherein said switching power supply includes a width modulated pulse generator generating a power supply and synchronized by a retrace pulse from said high voltage generator.

11. The high voltage supply of claim 6, wherin said sync pulses coupled to synchronize said drive signal are scanning retrace pulses.

12. A high voltage supply for a video display operable at a plurality of horizontal scannign frequencies, said high voltage supply comprising:

a first oscillator generating a drive signal;

a source of deflection rate pulses having said plurality of scanning frequencies coupled to said first oscillator for synchronizing said drive signal;

an high voltage generator coupled to said drive signal for generating an ultor supply; and a second oscillator, synchronized by a pulse signal generator by said high voltage generator for generating a source of power for said high voltage generator, wherein, interruption of said deflection rate pulses during a transition between ones of said plurality of scanning frequencies having different scanning frequencies results in no significant disturbance to said ultor supply 13. The high voltage supply of claim 12, wherein said first oscillator is synchronized and phase locked by said deflection pulses and, said pulse signal generated by said high voltage generator and during said interruption, said drive signal is consistently generated.

14. The high voltage supply of claim 12, wherein said drive signal is coupled exclusively to said high voltage generator.

15. The high voltage supply of claim 12, wherein said deflection pulses coupled to synchronize said first oscillator are scanning retraces pulses.

16. The high voltage supply of claim 17, wherein said second oscillator includes a switching power supply generating said power for said high voltage generator, and said switching power supply is synchronized for switching within one of a horizontal blanking region and overscan region of the display image.

* * * * *